US012749737B2

(12) United States Patent
Roy et al.

(10) Patent No.: US 12,749,737 B2
(45) Date of Patent: Sep. 29, 2026

(54) BATTERY PACK FOR VEHICLE

(71) Applicant: Clean Electric Private Limited, Bhopal (IN)

(72) Inventors: Abhinav Roy, Begusarai (IN); Akash Gupta, Bhopal (IN); Ankit Joshi, Chittorgarh (IN); Praveen Kumar Yadav, Dist-Ghazipur (IN)

(73) Assignee: Clean Electric Private Limited, Bhopal (IN)

( * ) Notice: Subject to any disclaimer, the term of this patent is extended or adjusted under 35 U.S.C. 154(b) by 221 days.

(21) Appl. No.: 18/546,079

(22) PCT Filed: Nov. 17, 2022

(86) PCT No.: PCT/IN2022/051009
§ 371 (c)(1),
(2) Date: Aug. 10, 2023

(87) PCT Pub. No.: WO2023/119314
PCT Pub. Date: Jun. 29, 2023

(65) Prior Publication Data

US 2024/0332671 A1 Oct. 3, 2024

(30) Foreign Application Priority Data

Dec. 23, 2021 (IN) ............................ 202121060233

(51) Int. Cl.
*H01M 10/6568* (2014.01)
*B60L 50/64* (2019.01)
(Continued)

(52) U.S. Cl.
CPC ......... *H01M 10/6568* (2015.04); *B60L 50/64* (2019.02); *H01M 10/613* (2015.04);
(Continued)

(58) Field of Classification Search
CPC ........... H01M 10/6568; H01M 10/625; H01M 10/6563; H01M 50/213; H01M 2220/20; B60L 50/64
(Continued)

(56) References Cited

U.S. PATENT DOCUMENTS

2007/0087266 A1* 4/2007 Bourke ............... H01M 50/505 429/61
2016/0372805 A1* 12/2016 Kim .................... H01M 50/204
(Continued)

FOREIGN PATENT DOCUMENTS

WO 2021234422 A1 11/2021

OTHER PUBLICATIONS

Prashant Gupta, Authorized Officer, Indian Patent Office, "International Search Report" in connection with related International Application No. PCT/IN2022/051009, dated Mar. 15, 2023, 3 pgs.
(Continued)

*Primary Examiner* — James M Erwin
(74) *Attorney, Agent, or Firm* — Kolisch Hartwell, P.C.

(57) ABSTRACT

A vehicle battery pack 100 includes at least one cell holder 102 for holding plural cells 106, and an enclosure 104 for enclosing the cell holder 102. The enclosure 106 includes a central body 112, a front endplate 114 and a rear endplate 116, each attached to a front and a rear of the central body 112, respectively. The central body 112 includes at least one coolant port 124 for filling a coolant in the enclosure 104. The central body 112 further includes a heat sink 126 for transferring heat from the coolant to the ambient area. The front endplate 114 includes a fan 130 and a pump 132, to make the battery pack 100 as a self-contained unit.

9 Claims, 10 Drawing Sheets

(51) Int. Cl.
*H01M 10/613* (2014.01)
*H01M 10/625* (2014.01)
*H01M 10/6563* (2014.01)
*H01M 50/213* (2021.01)

(52) U.S. Cl.
CPC ..... *H01M 10/625* (2015.04); *H01M 10/6563* (2015.04); *H01M 50/213* (2021.01); *H01M 2220/20* (2013.01)

(58) Field of Classification Search
USPC .............................................................. 429/82
See application file for complete search history.

(56) References Cited

U.S. PATENT DOCUMENTS

| | | | | |
|---|---|---|---|---|
| 2018/0118011 A1* | 5/2018 | Grace | ..................... | B60L 58/22 |
| 2018/0183114 A1* | 6/2018 | Rittner | .................. | H01M 50/24 |
| 2023/0207926 A1* | 6/2023 | Mehta | ................... | H01M 50/10<br>429/82 |

OTHER PUBLICATIONS

Prashant Gupta, Authorized Officer, Indian Patent Office, "Written Opinion of the International Searching Authority" in connection with related International Application No. PCT/IN2022/051009, dated Mar. 15, 2023, 5 pgs.

* cited by examiner

BATTERY PACK FOR VEHICLE

TECHNICAL FIELD

The present invention generally relates to battery packs for vehicles, and more particularly, the present invention relates to a self-contained battery pack capable of efficiently cooling the batteries used in electric vehicles.

BACKGROUND

A battery pack is a set of identical batteries or individual battery cells configured in a series, parallel or a combination of both to deliver the desired voltage, capacity, or power density. The battery packs are known to be widely used in electric vehicles for supplying power to the electric vehicle. Since the batteries are subjected to heavy usage during operation of the vehicle, they undergo rise in temperature. The conventional battery packs used in two/three-wheeler electric vehicles are air-cooled battery packs. It has been observed that the air-cooled battery packs fail to provide necessary cooling which is required for efficient working of the batteries. Some of the conventional battery packs used in two/three-wheeler electric vehicles are even available without any provision for cooling. Due to the lack of sufficient cooling, significant temperature difference occurs between the cells. The temperature difference can put some cells under excessive thermal stress, which can lead to cell failures resulting in a fire. The fire in one cell gets propagated to nearby cells and cause thermal runaway of the entire battery. In the conventional battery packs, there is no safety mechanism to contain the cell failure incidents. Moreover, the conventional battery packs are not suitable for fast charging and in case the batteries are fast charged, it reduces the life of the batteries and can cause some serious harm.

Further, the conventional battery packs provide very small surface area of heat transfer and due to which the temperature difference inside the cell gets quite high limiting the maximum charging and discharging current. In addition, the battery packs that have finned surfaces for cooling on the outside use thermal pads on the inside and therefore have a small heat transfer surface area. Moreover, for safety purposes, the battery packs need a much thicker thermal pad which further increases the thermal resistance and causes a much higher temperature difference with ambient. The additional thermal pads and heat transfer fins in contact with the cells, also increase the part count, cost and assembly complexity.

In view of the above, there remains a need for a novel battery pack that can overcome the above-mentioned limitations.

OBJECT OF THE INVENTION

An object of the present invention is to provide a battery pack for electric vehicles.

Another object of the present invention is to provide a battery pack that is a self-contained unit.

Another object of the present invention is to provide a battery pack that provides efficient cooling to the batteries used in the electric vehicles.

Another object of the present invention is to provide a battery pack that increases the life of the batteries used in the electric vehicles.

Another object of the present invention is to provide a battery pack that increases the charging and discharging capability of the batteries.

Another object of the present invention is to provide a battery pack that reduces the temperature difference between the individual cells as well as the temperature difference between the battery and the ambient.

Another object of the present invention is to provide a battery pack that enables the batteries to be charged at a fast rate.

SUMMARY OF THE INVENTION

According to an exemplary embodiment of the present invention, a battery pack for a vehicle is disclosed. The battery pack includes at least one cell holder for holding a plurality of cells, and an enclosure for enclosing the at least one cell holder. The enclosure includes a central body, a front endplate attached to a front of the central body, and a rear endplate attached to a rear of the central body. The central body includes at least one coolant port for filling a coolant into the enclosure. The central body further includes a heat sink for transferring heat from the coolant to the ambient. The front endplate is mounted with a fan and a pump so as to make it a self-contained unit.

It is to be understood that both the foregoing general description and the following detailed description are exemplary and explanatory only and are not restrictive of the invention, as claimed.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following figures, wherein.

DETAILED DESCRIPTION OF THE PREFERRED EMBODIMENTS

While the present invention is described herein by way of example using embodiments and illustrative drawings, those skilled in the art will recognize that the invention is not limited to the embodiments of drawing or drawings described, and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention. It is not suggested or represented that any or all of these matters form part of the prior art base or were common general knowledge in the field relevant to the present invention.

In this disclosure, whenever a composition or an element or a group of elements is preceded with the transitional phrase "comprising", it is understood that we also contemplate the same composition, element or group of elements with transitional phrases "consisting of", "consisting", "selected from the group of consisting of, "including", or "is" preceding the recitation of the composition, element or group of elements and vice versa.

The present invention is described hereinafter by various embodiments with reference to the accompanying drawings. This invention may, however, be embodied in many different forms and should not be construed as limited to the embodiment set forth herein. Rather, the embodiment is provided so that this disclosure will be thorough and complete and will fully convey the scope of the invention to those skilled in the art.

Figure 1:
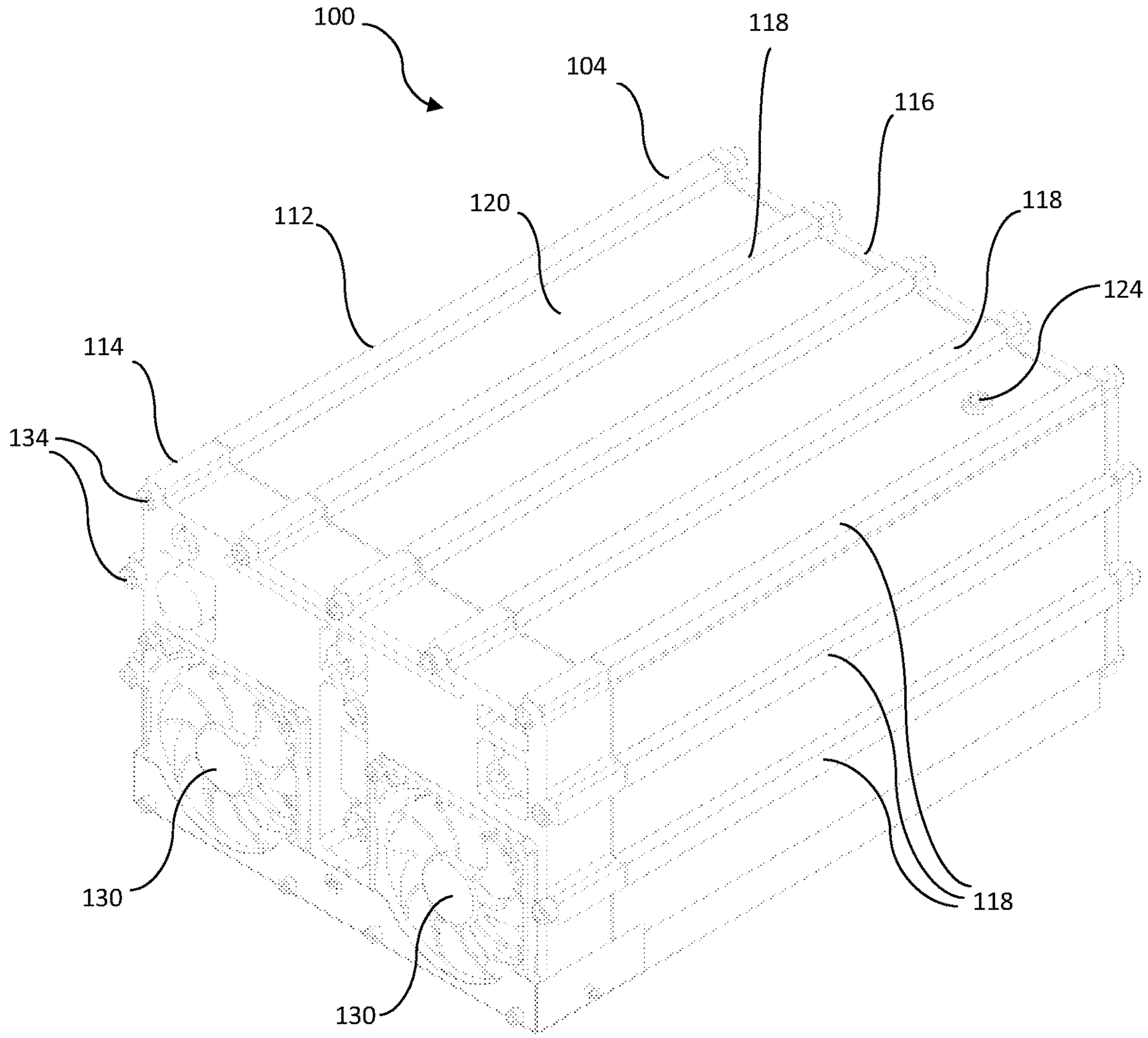
FIG. 1 illustrates a front perspective view of a battery pack, in accordance with an exemplary embodiment of the present invention.
Figure 2:
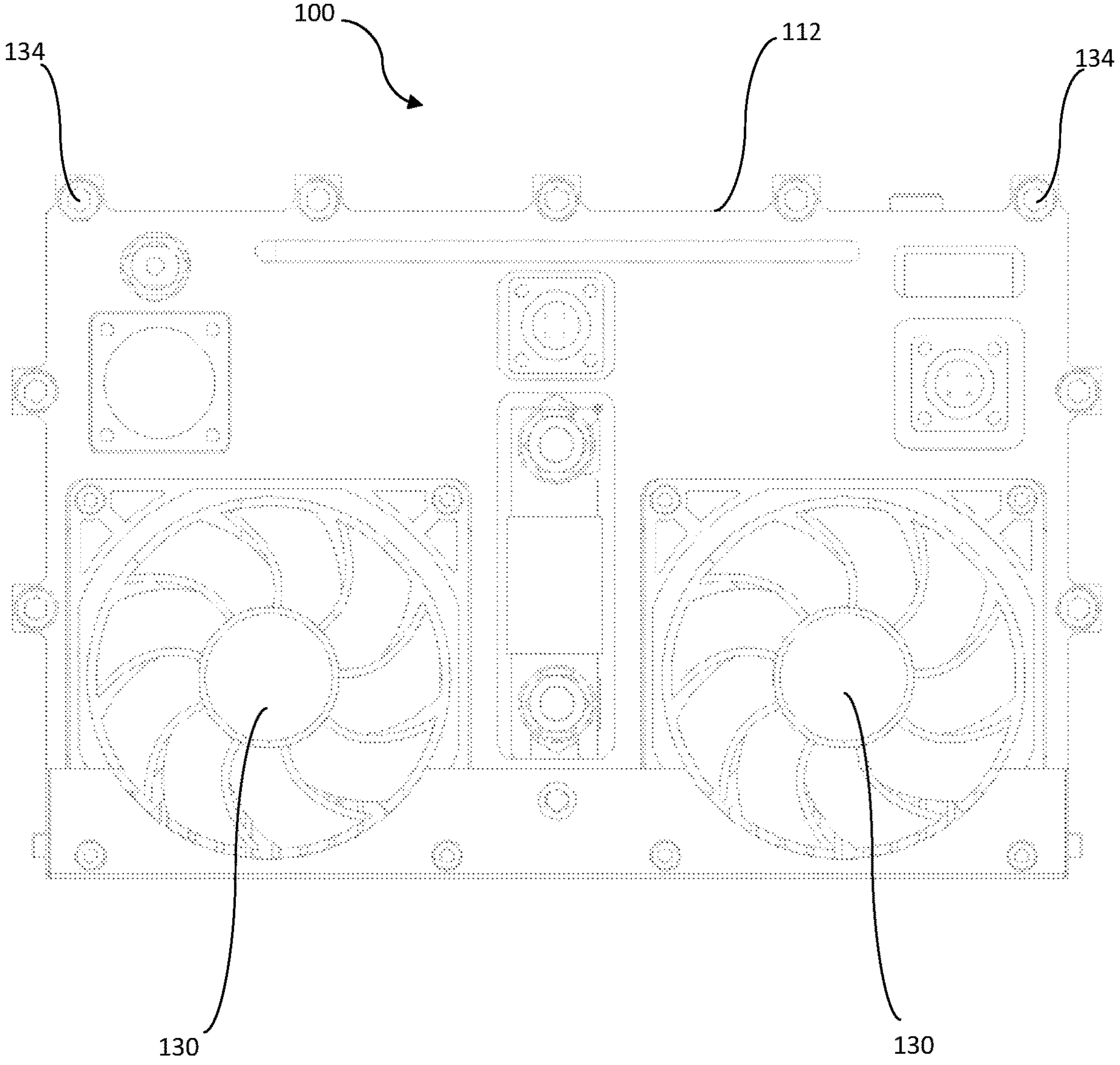
FIG. 2 illustrates a front view of the battery pack, in accordance with an exemplary embodiment of the present invention.
Figure 3:
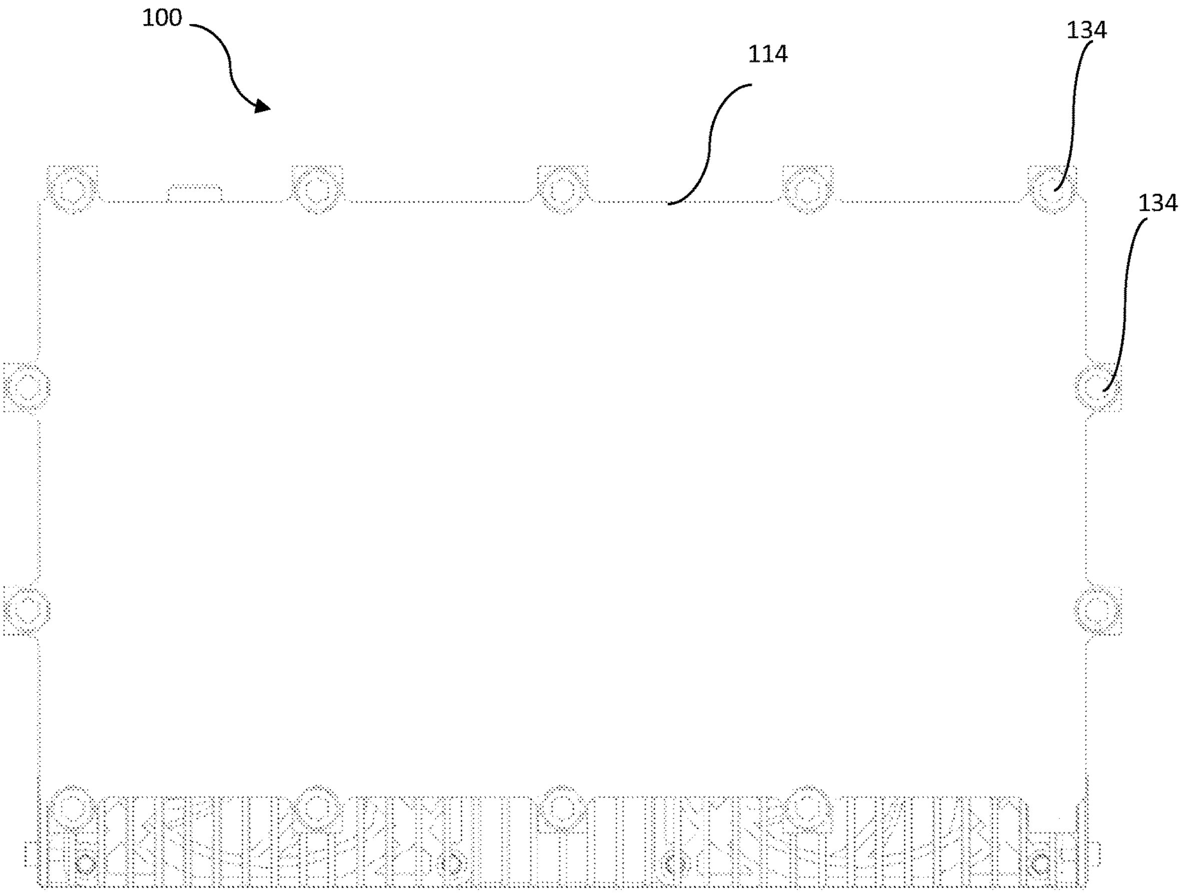
FIG. 3 illustrates a rear view of the battery pack, in accordance with an exemplary embodiment of the present invention.

The invention will now be described in detail with reference to the accompanying drawings. Referring now to FIG. 1, FIG. 2 and FIG. 3, a perspective view, a front view, and a rear view of a battery pack 100 is illustrated, in accordance with an exemplary embodiment of the present invention. The battery pack 100 may be employed in electric vehicles, and specifically, in two-wheeler or three-wheeler electric vehicles that lacks space for implementing a cooling technology for the batteries. The battery pack 100 disclosed herein is a self-contained unit that improves the packing efficiency of the batteries and is convenient to integrate in various applications. In other words, the battery pack 100 removes the need for an external heat exchanging mechanism that would require a pipe to connect to the batteries for cooling the batteries. It should be noted that although the battery pack 100 herein is explained in relation to electric vehicles, the battery pack 100 may be employed in any application known in the art that requires a battery pack as well as cooling of the batteries.

Figure 4:
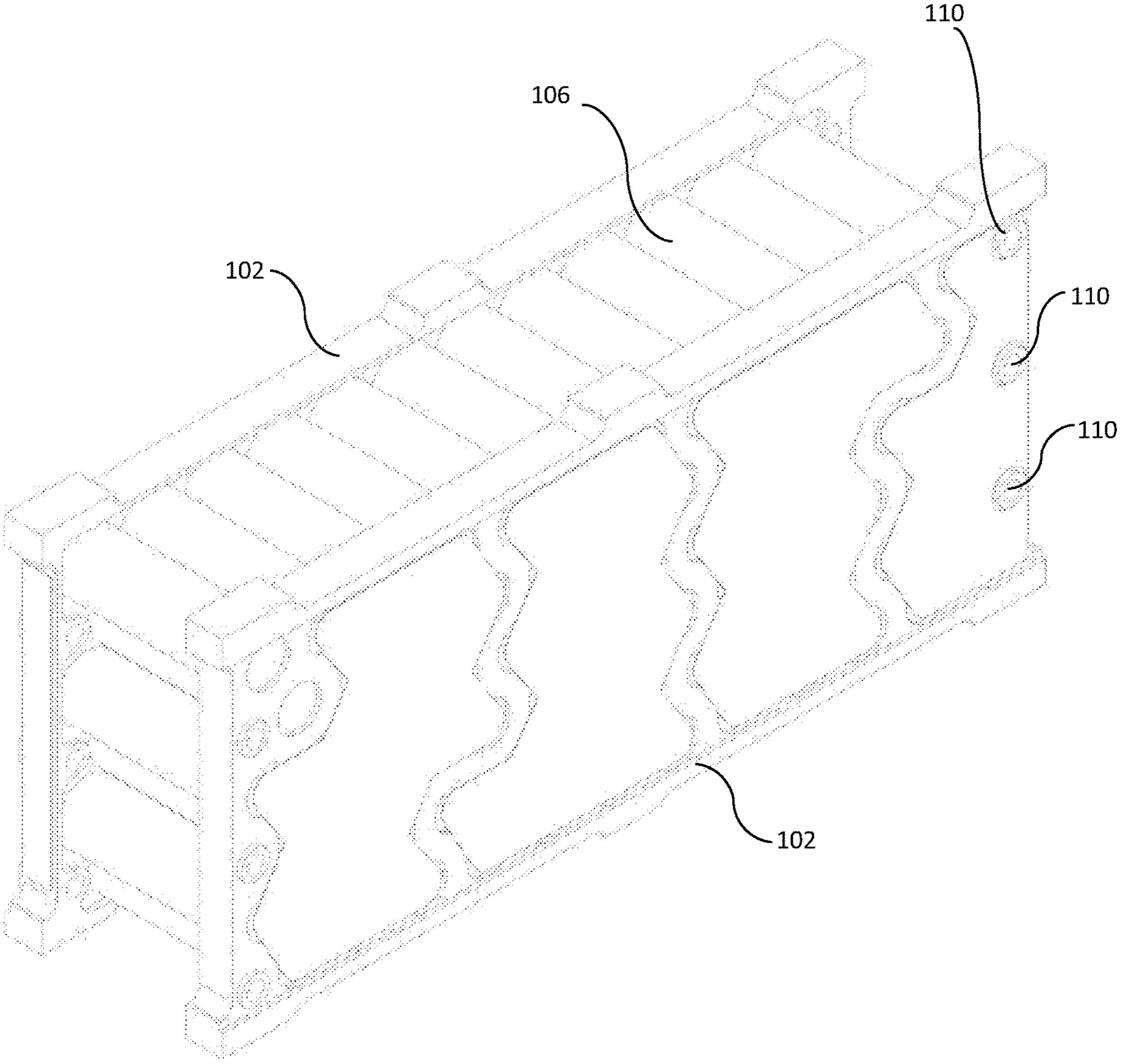
FIG. 4 illustrates a perspective view of a cell holder along with a plurality of cells, in accordance with an exemplary embodiment of the present invention.

The battery pack 100 includes at least one cell holder 102 (shown in FIG. 4), and an enclosure 104 for enclosing the cell holder 102. The cell holder 102 is configured to hold a plurality of cells 106 (shown in FIG. 4). Specifically, the cell holder 102 may include a plurality of pockets for holding the plurality of cells 106. Referring to FIG. 4, a perspective view of the cell holder 102 along with the plurality of cells 106 is illustrated, in accordance with an exemplary embodiment of the present invention. The plurality of cells 106 may be arranged either in series or parallel or a combination of both series and parallel. It will be apparent to a person skilled in the art that the arrangement of the plurality of cells 106 will be based on the desired voltage and current. The arrangement of the plurality of cells 106 in the cell holder 102 shown in FIG. 4 is of 7s10p configuration in which the positive terminal and the negative terminal are diagonally opposite to each other. In the case of cell holders 102 with even number of cell groups in series, the terminals will come on the same side. If single side cell to cell interconnection is done, the terminals will always come on one side.

Figure 5:
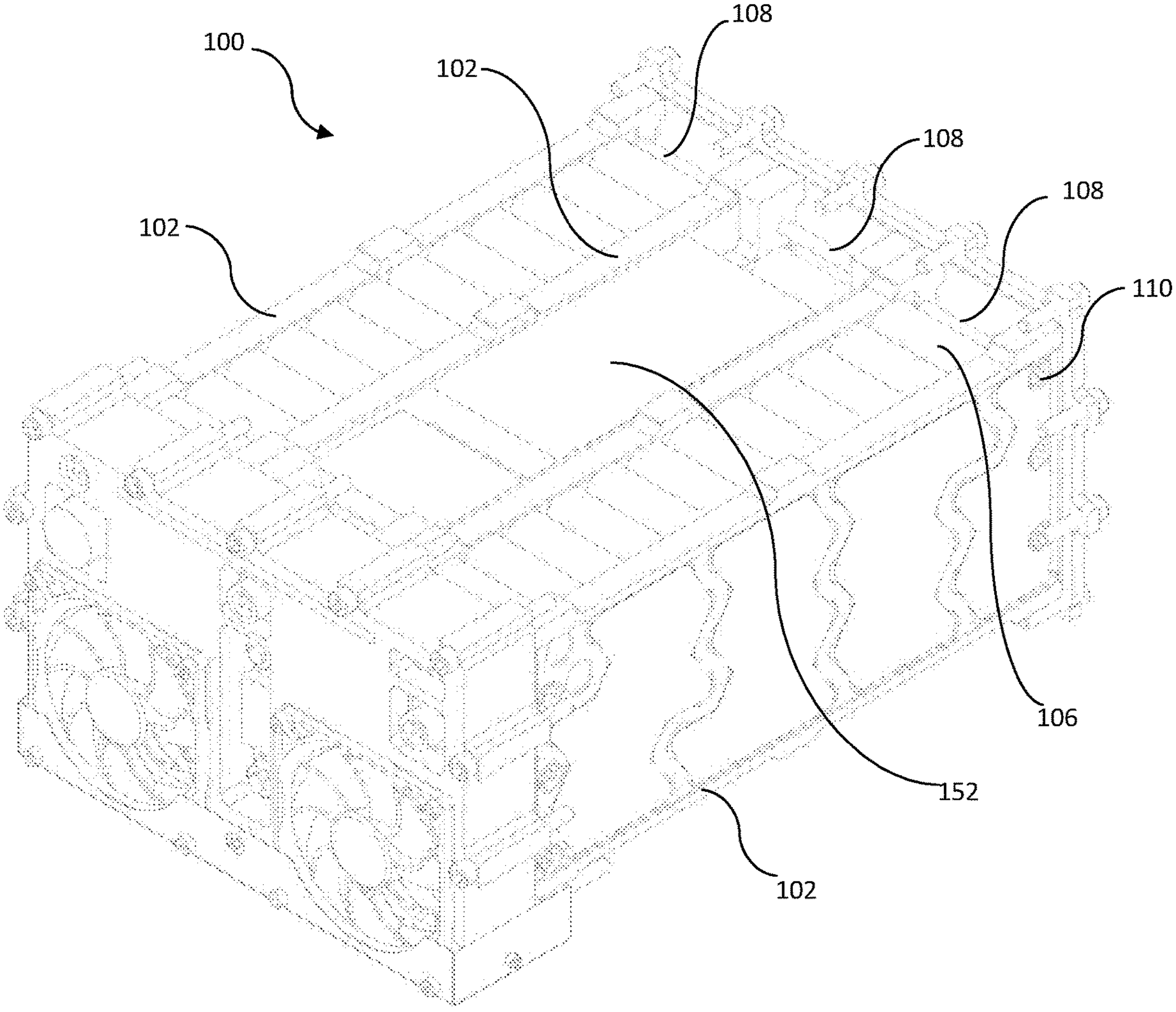
FIG. 5 illustrates a perspective view of the battery pack without the enclosure, in accordance with an exemplary embodiment of the present invention.
Figure 6:
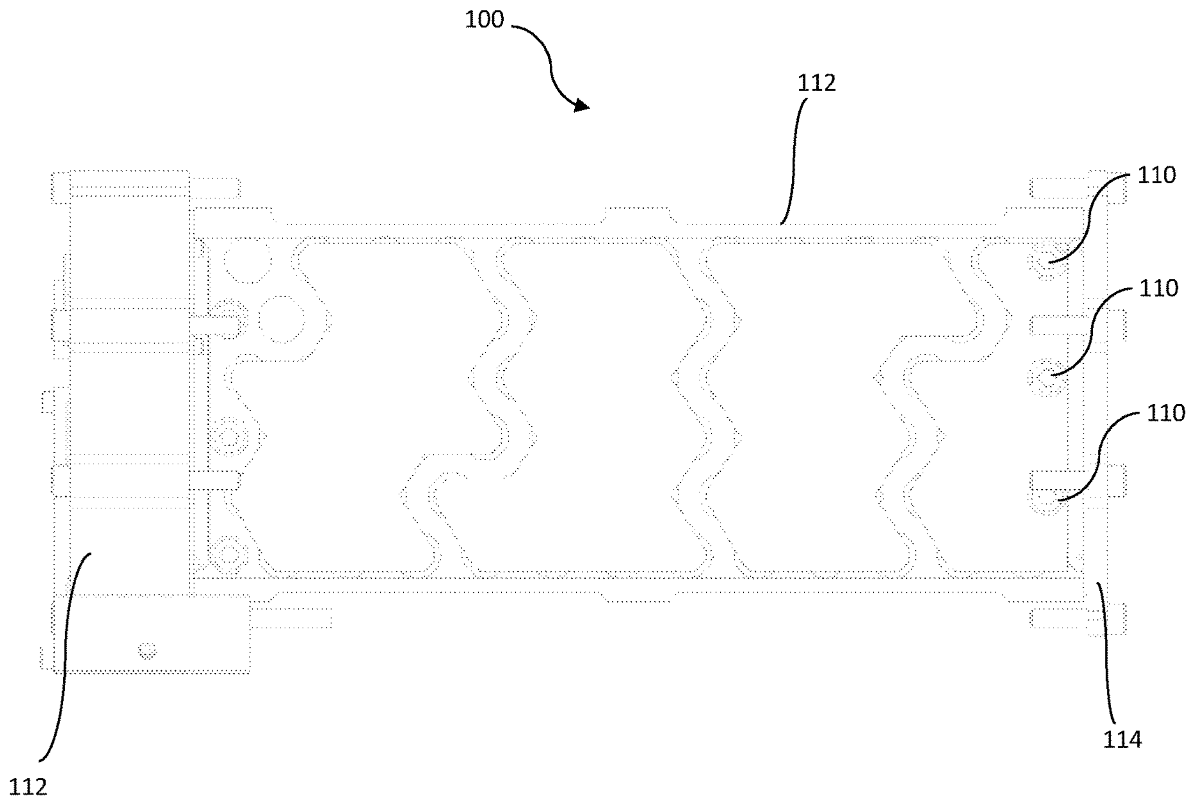
FIG. 6 illustrates a side view of the battery pack without the enclosure, in accordance with an exemplary embodiment of the present invention.

In order to form a battery, multiple such cell holders 102 along with the plurality of cells 106 are connected with each other to give the overall system configuration of voltage and current. It should be noted that the cell holder 102 along with a plurality of cells 106 may also be interchangeably referred to as a supercell in the specification. Referring now to FIG. 5 and FIG. 6, a perspective view and a side view of the battery pack 100 without the enclosure 104 is illustrated, in accordance with an exemplary embodiment of the present invention. As shown in FIG. 5, three supercells are connected with each other in series to form the battery. These supercells may be connected with each other through fasteners 108 such as bolts passing through holes 110 provided on the cell holders 102. The cell holder 102 may include the holes 110 on the peripheral portion such that when the cell holders 110 are arranged adjacent to each other, all the holes 110 align together.

Figure 7:
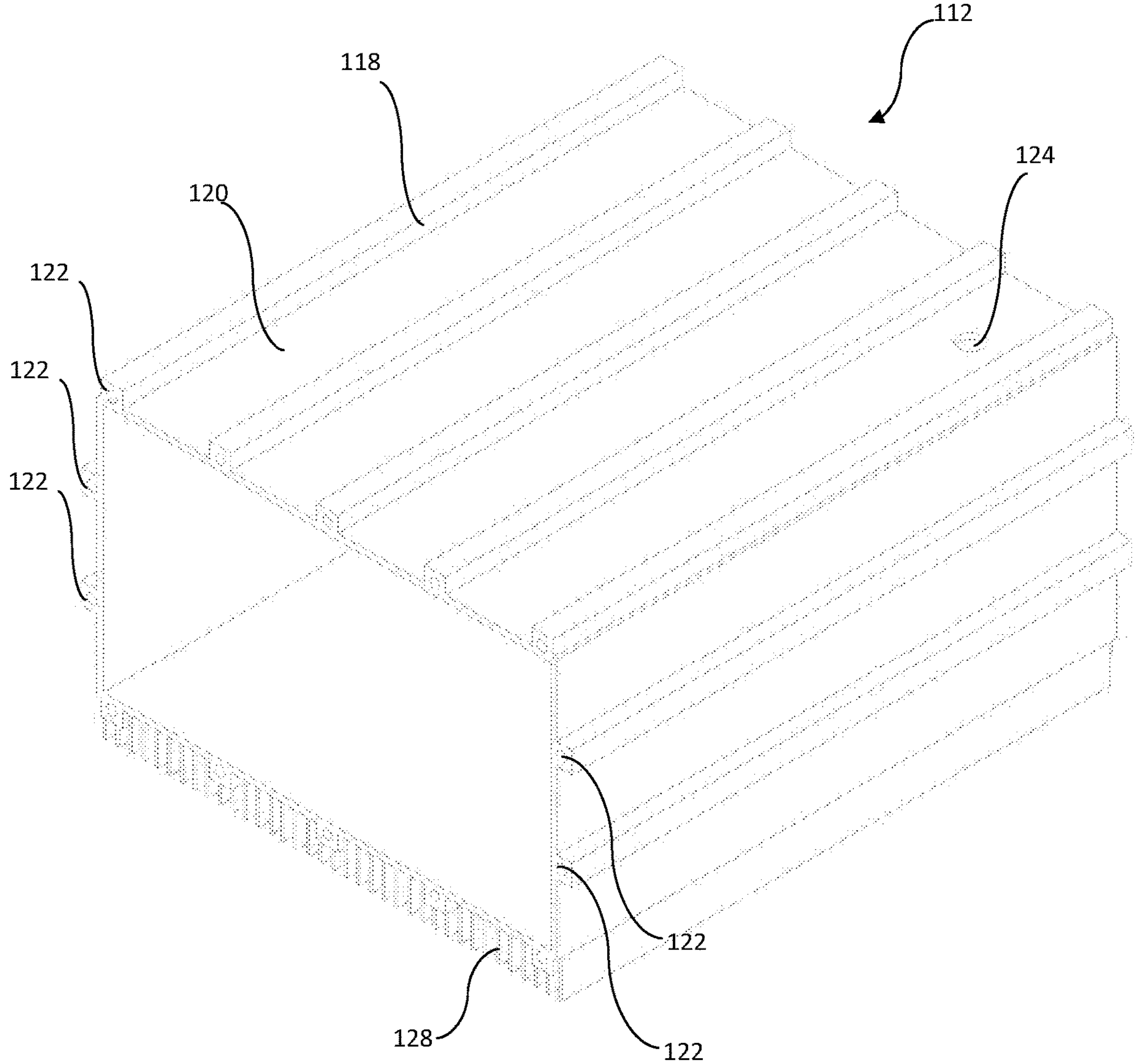
FIG. 7 illustrates a perspective view of a central body of the enclosure, in accordance with an exemplary embodiment of the present invention.

The enclosure 104 is configured to enclose the cell holder 102 along with the plurality of cells 106. In other words, the enclosure 104 is configured to enclose the battery which is formed by combining multiple supercells. For the purpose of explanation, the enclosure 104 may hold the battery, and a coolant is circulated inside the enclosure 104. Due to such an arrangement, the battery may be immersed in the coolant. The enclosure 104 includes a central body 112, a front endplate 114, and a rear endplate 116. The central body 112 is adapted to substantially cover the cell holder 102. Specifically, the central body 112 is configured to cover a top, a bottom, and sides of the battery. Referring to FIG. 7, a perspective view of the central body 112 is illustrated, in accordance with an exemplary embodiment of the present invention. In an embodiment, the central body 112 may have a shape substantially similar to a cuboid. Further, the front section and the rear section of the central body 112 may be open so as to resemble a hollow body. The central body 112 includes a plurality of protrusions 118 on an outer surface 120 of the central body 112. In an embodiment, these protrusions 118 may stretch from the front to the rear of the central body 112. Each of these protrusions 118 may include a hole 122 for attaching the front endplate 114 and the rear end plate 116. In other words, the front endplate 114 and the rear endplate 116 may be fastened to the front and the rear respectively of the central body 112 using fasteners known in the art. In an embodiment, the fasteners may include a bolt 134 (shown in FIG. 2 and FIG. 3) for engaging into the hole 122.

The central body 112 further includes at least one coolant port 124 for filling the coolant into the enclosure 104. In an embodiment, the central body 112 may have one coolant port 124 for filling the coolant into the enclosure 104 and another coolant port 124 for removing the coolant from the enclosure 104. In another embodiment, the central body 112 may have a single coolant port 124 for both filling and removing the coolant from the enclosure 104. The coolant used for cooling the battery may be a dielectric fluid. For the purpose of explanation, the cell holder 102 may be submerged in the coolant filled inside the enclosure 104. The central body 112 may further include a heat sink 126 on the outside surface 120 of the central body 112. In an embodiment, the heat sink 126 may be provided at the bottom of the central body 112. However, it will be apparent to a person skilled in the art that the heat sinks 126 may be provided on any side of the central body 112. The heat sink 126 may include fins 128 for transferring heat from the coolant to the ambient. In an embodiment, the fins 128 may directly extend from the bottom of the central body 112. The fins 128 may be adapted to increase the heat transfer area and thus reduce convection heat transfer resistance to air from the heat sink. In an embodiment, the central body 112 may be made by extrusion process. In another embodiment, the central body 112 may be made by pressure die casting. In yet another embodiment, the central body 112 may be made by using injection molding. The central body 112 may be made of materials such as, but not limited to, aluminium, Nylon, PP etc. The battery pack 100 further includes an insulation sheet arranged between the adjacent cell holders 102, and between the cell holder 102 and an inner surface of the central body 112 to provide protection against short circuiting between them. The enclosure 104 also encloses the battery management system 152 which is in connection with the battery.

The battery pack 100 further includes the front endplate 114 and the rear endplate 116. The front endplate 114 is fastened to the front of the central body 112, and the rear endplate 116 is fastened to the rear of the central body 112. Further, both the front endplate 114 and the rear endplate 116 are fastened to the front and the rear of the central body 112 using a gasket or a flange sealant in-between. It will be apparent to a person skilled in the art that the gasket or flange sealant will prevent the coolant leakage from the enclosure 104. It will be apparent to a person skilled in the art that the front endplate 114 and the rear endplate 116 when mounted to the central body 112 may form the enclosure 104.

Figure 8:
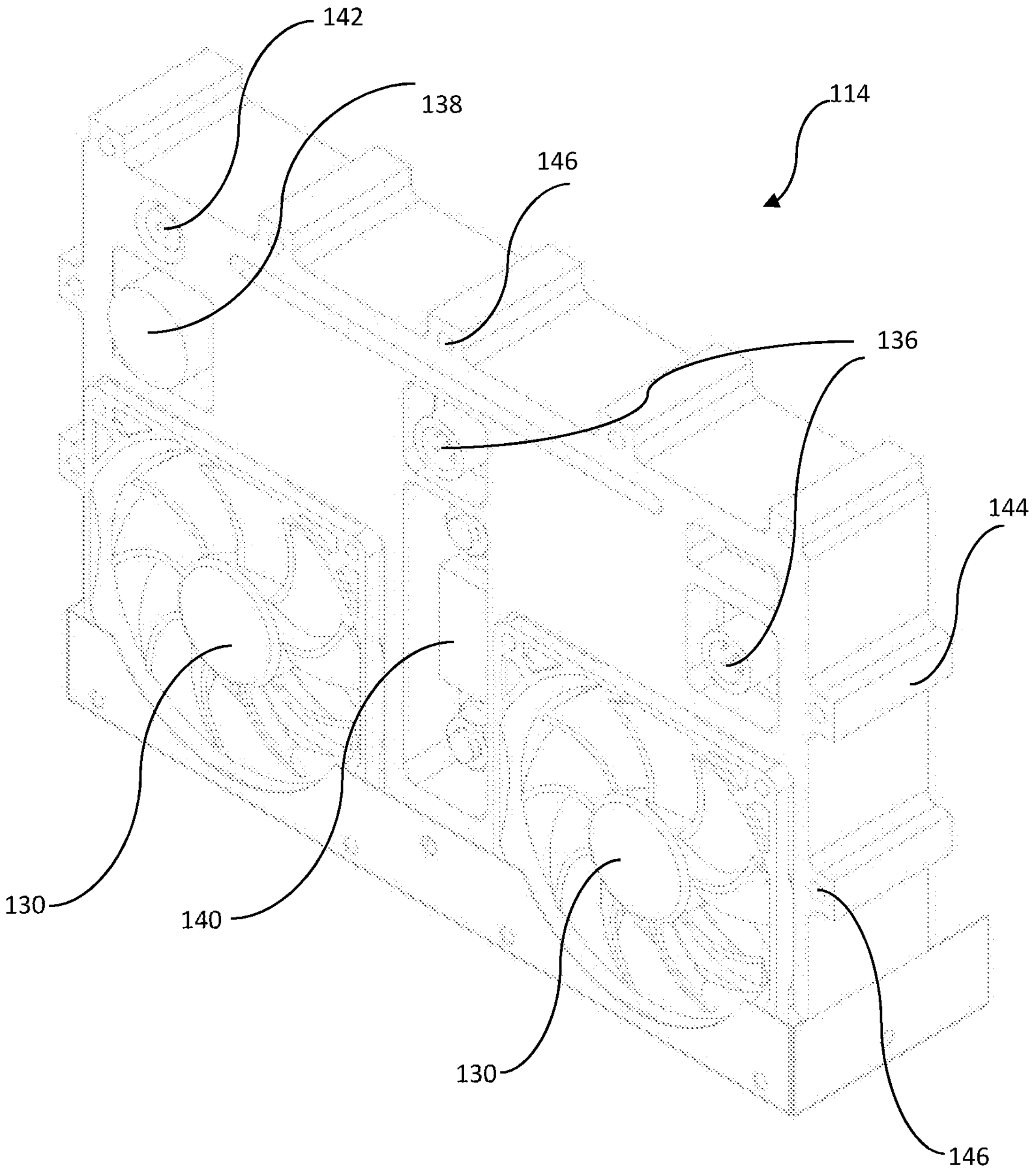
FIG. 8 illustrates a perspective front perspective view of a front endplate of the enclosure, in accordance with an exemplary embodiment of the present invention.
Figure 9:
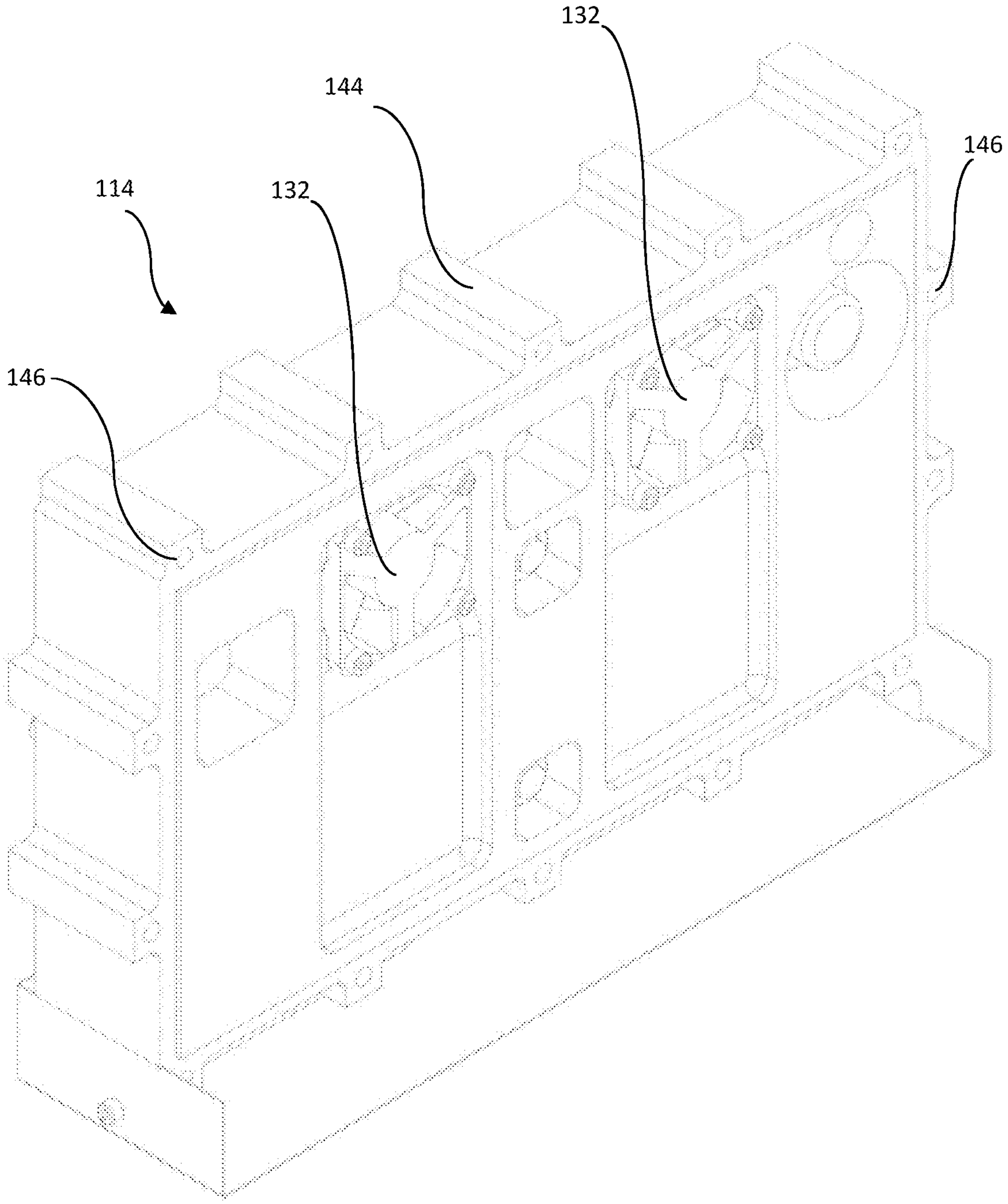
FIG. 9 illustrates a perspective rear view of the front endplate of the enclosure, in accordance with an exemplary embodiment of the present invention.

Referring to FIG. 8 and FIG. 9, a front view and a rear view of the front endplate 114 is illustrated, in accordance with an embodiment of the present invention. The front endplate 114 is designed in such a manner so as to accommodate a fan 130 and a pump 132. The front endplate 114 may have grooves to house the fan 130 and the pump 132 . . . . Due to such an arrangement, the battery pack 100 acts as a self-contained unit. In some embodiments the pump 132 may be mounted on the group of cell holders 102 behind the front end plate 114. The fan 130 is configured to remove the heat from the fins 128 which is further received from the coolant. The front endplate 114 may further have coolant passages for the flow of coolant to the pump 132. There are several ways of establishing coolant convection current inside the battery pack 100. One of the possible ways can be pumping the coolant through the pump 132 into the supercells and then collecting the passed coolant back through a coolant passage given on the heat sink 126 side thereby rejecting heat from the heated coolant into the heat sink 126 through forced convection from the coolant. The coolant is again circulated into the supercells through the coolant pump 132 maintaining a coolant circulation in a closed loop in a sealed enclosure. The front endplate 114 is further adapted to house components such as a low voltage connector 136, high voltage connector 138, fuse element 140 etc. The interfaces between the front endplate 114 and the components mounted on it, are sealed with different mechanisms like thread sealants, gaskets, adhesives or O-rings. Moreover, a pressure relief valve 142 is provided on the front endplate 114 or the central body 112 in case the pressure inside the enclosure 100 increases due to significant temperature rise inside the enclosure 100. The front endplate 114 may further include a plurality of electrical connectors to connect the battery pack 100 with the electric vehicle. The front endplate 114 further includes a plurality of projections 144 on its outer surface such that when arranged on the front of the central body 112, they align with the projection 118 of the central body 112. Further, each of the projections 144 include an opening 146 that aligns with the hole 122 of the projections 118 of the central body.

Figure 10:
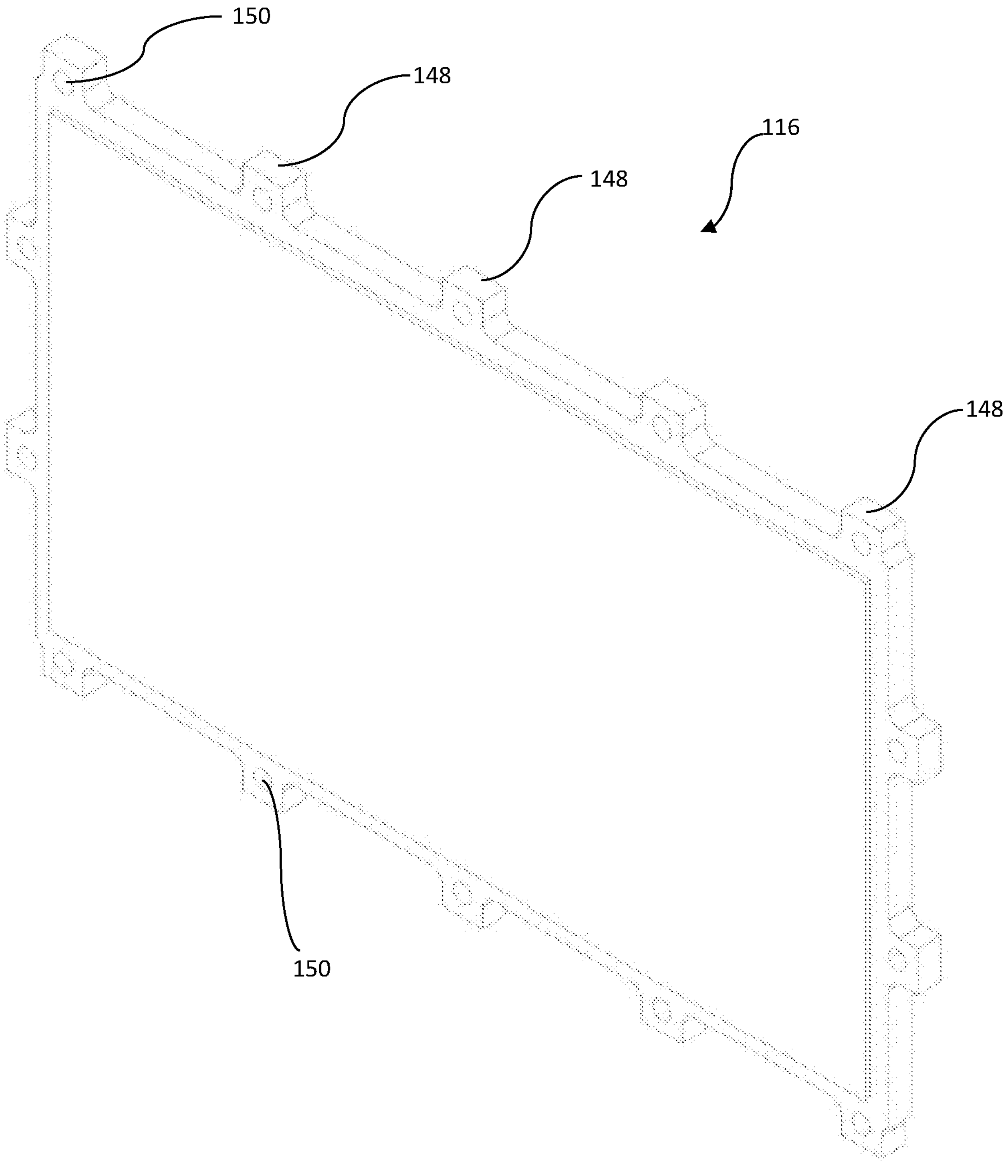
FIG. 10 illustrates a perspective view of a rear endplate of the enclosure, in accordance with an exemplary embodiment of the present invention.

FIG. 10 illustrates a perspective view of the rear endplate 116, in accordance with an exemplary embodiment of the present invention. The rear endplate 116 includes a plurality of projections 148 on its outer surface such that when arranged on the rear of the central body 112, they align with the projection 118 of the central body 112. Further, each of the projections 148 include an opening 150 that aligns with the hole 122 of the projections 118 of the central body.

The present invention solves the problem of reduced battery life and slow charging capability which currently plagues most of the lithium-ion battery packs. With the cells completely submerged in the coolant and with a coolant circulation via the pump 132, the heat transfer surface area and heat transfer coefficient both area increased significantly reducing the temperature difference within the cell and with the surrounding thus providing better life and again increases the charge discharge capability of the cells.

The present invention further works on the principle of immersion battery cooling technology where the pump 132, the heat sink 126 and the fan 130 are incorporated into a single battery pack. Therefore, the invention removes the need for an external heat exchanging mechanism such as radiators, pumps, filters/fans etc. that would have been connected with pipes to the battery pack.

Further, as mentioned above, in the present invention, each cell is immersed in a high flash point dielectric fluid. Therefore, in case fire breaks out in one of the cells, this dielectric fluid acts as a thermal buffer and soaks up all the heat that is released. This limits the temperature rise in other nearby cells and hence protects them from a thermal runaway event.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claims.

What is claimed:

1. A battery pack (100) comprising:

at least one cell holder (102) for holding a plurality of cells (106);

an enclosure (104) enclosing the at least one cell holder (102), the enclosure (104) having a central body (112), a front endplate (114) attached to a front of the central body (112), and a rear endplate (116) attached to a rear of the central body (112), wherein, the central body (112) includes at least one coolant port (124) for filling a coolant into the enclosure (104), and a heat sink (126) for transferring heat from the coolant to the ambient environment and, the front endplate (114) is mounted with a fan (130) and a pump (132).

2. The battery pack of claim 1, wherein the coolant is a dielectric fluid.

3. The battery pack of claim 1, wherein the at least one cell holder (102) is submerged in the coolant filled inside the enclosure (104).

4. The battery pack of claim 1, wherein the central body (112) is adapted to substantially cover the at least one cell holder (102).

5. The battery pack of claim 1, wherein the enclosure (104) includes a coolant passage for the coolant to flow inside the enclosure (104).

6. The battery pack of claim 1, further comprising an insulation sheet arranged between adjacent cell holders (102), and between the at least one cell holder (102) and an inner surface of the central body (112).

7. The battery pack of claim 1, wherein the central body (112) includes a plurality of protrusions (118) on an outer surface (120), the plurality of protrusions (118) include a hole (122) for fastening the front endplate (114) and the rear endplate (116) to the front and the rear, respectively.

8. The battery pack of claim 1, wherein the front endplate (114) and the rear endplate (116) are attached to the front and the rear, respectively, of the central body (112) via at least one of a gasket sealant and a flange sealant.

9. The battery pack of claim 1, wherein the front endplate (114) is adapted to house at least one of a low voltage connector (136), a high voltage connector (138), a fuse element (140), and a pressure relief valve (142).

* * * * *